UNITED STATES PATENT OFFICE.

CHRISTIAN WESTPHAL, OF BERLIN, GERMANY.

INCOMBUSTIBLE BURNER.

SPECIFICATION forming part of Letters Patent No. 538,568, dated April 30, 1895.

Application filed August 4, 1894. Serial No. 519,785. (No specimens.)

*To all whom it may concern:*

Be it known that I, CHRISTIAN WESTPHAL, a subject of the King of Prussia, German Emperor, residing at Berlin, in the Kingdom of Prussia, Germany, have invented certain new and useful Improvements in Incombustible Burners; and I do hereby declare that the following is a full, clear, and exact description of the invention, which will enable others skilled in the art to which it appertains to use the same.

This invention relates to certain improvements in the manufacture of incombustible materials, such as are employed for gas burner tips and for fire-kindlers, and for stove linings and the like, and has for its object to produce a substance which shall be at once cheap and readily worked and which shall possess the heat resisting quality to a higher degree than other similar substances heretofore prepared, all as will be hereinafter fully set forth.

The novel features of the invention will be carefully defined in the claim.

In carrying out my invention, I employ as a base or body, compounds of the alkaline earth metals, as calcium, magnesium, barium, strontium, &c., which compounds may be either natural or artificial products, as the fluorates, silicates, carbonates, oxides, &c., chalk or infusorial earth, clay or kaolin, talc or soapstone, sand, quartz, limestone, or the natural sulphates of the metals, gypsum, heavy spar, &c. The base of my improved incombustible substance may be composed of either one of these compounds, or of a mixture of several or all of them. To this base I add compounds of the metals, such as the oxides of iron, manganese, tin, lead, zinc, &c., and after thorough mixture, the mass is moistened with a solution of water glass, alum, boracic acid or the like, molded into form and eventually fired.

The addition of the compounds of the iron metals to the base gives the product increased heat resisting qualities and also prevents the same from cracking or warping while being fired.

When it is desirable that the finished product shall be porous I add to the mixture before the same is molded to shape, such materials as may be wholly or partially volatilized or vaporized and for some special purposes I add to the mixture flour of sulphur which will be partly volatilized and will enter in part into combination with the various compounds of the mixture so as to give the finished body a glassy appearance. This glassy appearance is especially desirable for burner tips for street lamps and for marine use where they are exposed to dampness.

The product produced as above described is also well adapted to replace the wicks used in oil lamps and other heating apparatus.

Having thus described my invention, I claim—

As a new article of manufacture, an incombustible substance composed of a mixture of compounds of the alkaline earth metals, with compounds of the iron metals and additions of sulphur, and a vitrifying substance, the mass molded into form and fired, substantially as specified.

In testimony whereof I have signed my name to this specification in the presence of two subscribing witnesses.

CHRISTIAN WESTPHAL.

Witnesses:
   THEOBALD LORENZ,
   W. HAUPT.